M. C. CONWELL.
TOOL.
APPLICATION FILED JUNE 26, 1919.
1,361,686.
Patented Dec. 7, 1920.
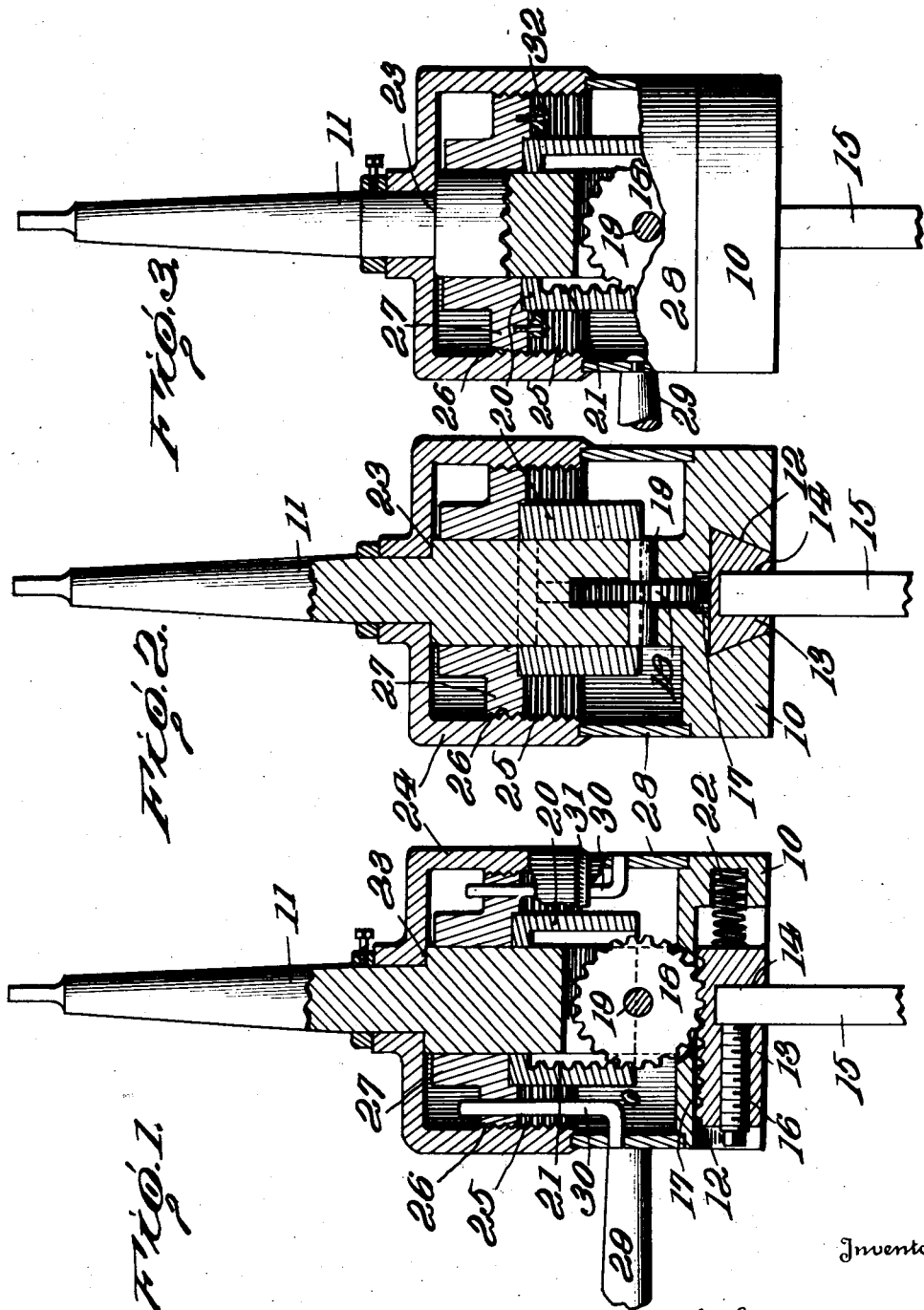

UNITED STATES PATENT OFFICE.

MYERS C. CONWELL, OF LARCHMONT, NEW YORK, ASSIGNOR TO LAURA E. CONWELL, OF LARCHMONT, NEW YORK.

TOOL.

1,361,686.	Specification of Letters Patent.	Patented Dec. 7, 1920.

Application filed June 26, 1919. Serial No. 307,009.

*To all whom it may concern:*

Be it known that I, MYERS C. CONWELL, a citizen of the United States, residing at Larchmont, in the county of Westchester and State of New York, have invented a new and useful Tool, of which the following is a specification.

This invention is a tool of the type employed in connection with drill presses and the like.

One of the objects of the invention is to provide a boring tool capable of use in any ordinary or well known type of drill press, and having means whereby boring by means of a single pointed tool may be done with speed and accuracy, especially where odd sizes of holes are required and exact fits are necessary. A further object is to provide a tool of the character referred to, which will be capable of facing, cutting rings, undercutting, etc. A further object is to provide means whereby the tool may be adjusted for different kinds of work without arresting rotation of the tool.

The invention will be hereinafter fully set forth and particularly pointed out in the claims.

In the accompanying drawing:—

Figure 1 is a longitudinal sectional view illustrating a tool constructed in accordance with the invention. Fig. 2 is a similar sectional view taken at right angles to the section of Fig. 1. Fig. 3 is a detail view illustrating a slight modification.

Referring to the drawing, 10 designates a tool body provided with a shank 11, and with an undercut slot 12, the latter being in the lower end of the tool and arranged radially with respect to the axis thereof. Slidably mounted in the slot 12 is a tool shifting block 13, provided with a socket 14, for a bit 15, which may be held in position in suitable manner, as by the screw 16. The top surface of the block 13 is provided with rack teeth 17, meshing with a gear 18, rotatably mounted upon a shaft 19. Said gear is actuated by means of a collar 20, slidably mounted upon the body 10, and provided with internal teeth 21, meshing with the gear. For the purpose of applying force tending normally to move the block 13 toward the center of the body 10, suitable means may be provided, such as a spring 22.

Supported by an annular shoulder 23 formed on the body 10, is a shell 24, free to turn relative to said body, and provided with internal screw threads 25, engaging external threads 26, on an adjusting ring 27, which also loosely engages the body 10, and rests upon the collar 20. In order that the parts may be retained in juxtaposition, the ring 27 is provided with a recess to receive the upper end of the collar 20. The space between the lower end of the shell 24 and the bottom portion of the body 10 is closed by a casing 28, which is provided with an arm 29, positioned to engage the machine frame and prevent rotation of the casing. Said casing is provided with internal guide rods or pins 30 which extend through and guide the ring 27 in its movements. The lower edge of the shell 24 is provided with graduations 31, by means of which the operator is enabled to nicely regulate his adjustments of the tool.

In operation, the shank 11 is engaged with a rotating member of a drill press or other machine in a well known manner, so that the body 10, tool shifting block 13, gear 18 and collar 20 will be rotated, the ring 27, shell 24 and casing 28, remaining stationary. When it is desired to adjust the position of the bit 15, the operator, without arresting rotation of the tool, rotates the shell 24 manually in either direction, with the result that ring 27 is moved up or down, as the case may be, thereby effecting rotation of the gear 18 through the medium of the teeth 21. All movement of the gear 18 in either direction is communicated to the tool shifting block 13, by reason of the engagement of said gear with the teeth 17, the spring 22 serving to cause the block to follow up the gear when the rotation of the shell 24 is in a direction to elevate the ring 27.

From the foregoing it will be readily understood that the invention is a tool capable of being placed in any ordinary drill press, and provided with means whereby it may be adjusted to work requiring accuracy and skill, all adjustments being possible without arresting movement of the tool, whereby the character of the work to be performed may be greatly varied.

In lieu of the spring 22, the ring 27 may be provided with a collar 32, engaging the collar 20 so that said collar 20 will move in either direction with the ring 27, and impart positive movement to the gear 18 and tool shifting block 13 in corresponding directions. See Fig. 3.

Having thus explained the nature of the invention and described an operative manner of constructing and using the same, although without attempting to set forth all of the forms in which it may be made or all of the forms of its use, what is claimed is:—

1. A tool of the character described comprising a body, an adjustable tool shifting block carried thereby, a normally stationary ring movable independently of said body and operatively connected with said block, means for preventing rotation of said ring, and means movable independently of the tool body for actuating said ring.

2. A tool of the character described comprising a body, an adjustable tool shifting block carried thereby, a ring movable longitudinally of said body and operatively connected with said block, means for preventing rotation of said ring, and means for actuating said ring.

3. A tool of the character described comprising a body, an adjustable tool shifting block carried thereby, a ring movable longitudinally of said body and operatively connected with said block, means for preventing rotation of said ring, and a rotatable shell having means for imparting movement to said ring longitudinally of the tool.

4. A tool of the character described comprising a body, an adjustable tool shifting block carried thereby, a ring movable longitudinally of said body and operatively connected with said block, means for preventing rotation of said ring, and a rotatable shell, said ring and said shell having complemental screw threads by means of which movement may be imparted to the ring longitudinally of the tool.

5. A tool of the character described comprising a body, an adjustable tool shifting block carried thereby, a collar movable longitudinally of the body and operatively connected with said block, an actuating ring engaging said collar, and means for actuating said ring, whereby the position of the collar is varied.

6. A tool of the character described comprising a body, an adjustable tool shifting block carried thereby, a collar movable longitudinally of the body and operatively connected with said block, an actuating ring engaging said collar, means for preventing rotation of said ring, and a rotatable shell having means for imparting movement to said ring longitudinally of the tool.

7. A tool of the character described comprising a body, an adjustable tool shifting block carried thereby, an actuating ring movable longitudinally of said body, means for preventing rotation of said ring, a collar actuated by said ring and operatively connected with said block, and means for adjusting said ring.

8. A tool of the character described comprising a body, an adjustable tool shifting block carried thereby, an actuating ring adjustable longitudinally of said body, means for preventing rotation of said ring, a collar actuated by said ring and operatively connected with said block, and a rotatable shell having means for effecting adjustments of said ring.

9. A tool of the character described comprising a body, an adjustable tool shifting block carried thereby, an actuating ring adjustable longitudinally of said body, and provided with an external screw thread, means for preventing rotation of said ring, a collar actuated by said ring and operatively connected with said block, and a rotatable shell having internal threads engaging the external thread of said ring.

10. A tool of the character described comprising a body, an adjustable tool shifting block carried thereby, a rotatable member for adjusting said block, an actuating ring adjustable longitudinally of said body and operatively connected with said rotatable member, means for preventing rotation of said ring, and means for adjusting said ring.

11. A tool of the character described comprising a body, an adjustable tool shifting block carried thereby, a rotatable member for adjusting said block, an actuating ring adjustable longitudinally of the body, a collar actuated by said ring and operatively engaging said rotatable member, said collar being movable with the ring, and means for adjusting said ring.

12. A tool of the character described comprising a body, an adjustable tool shifting block carried thereby, an actuating ring adjustable longitudinally of the body and operatively connected with said block, a shell having means for adjusting said ring, a casing, guide rods carried by said casing and engaging said ring, and means for preventing rotation of said casing.

In testimony whereof I have hereunto set my hand.

MYERS C. CONWELL.